(12) United States Patent
Mnatsakanian (10) Patent No.: US 6,364,614 B1
(45) Date of Patent: Apr. 2, 2002

(54) SPINNER WITH CONTINUOUS 3-FOLD SYMMETRY FOR MULTIPLE UTILITARIAN, EDUCATIONAL AND ORNAMENTAL USES

(75) Inventor: Mamikon Mnatsakanian, Pasadena, CA (US)

(73) Assignee: Hi-Q Products, Alhambra, CA (US)

( * ) Notice: Subject to any disclaimer, the term of this patent is extended or adjusted under 35 U.S.C. 154(b) by 0 days.

(21) Appl. No.: 09/479,407

(22) Filed: Jan. 6, 2000

(51) Int. Cl.[7] ................................................ B63H 1/26
(52) U.S. Cl. ............................ 416/223 R; 416/231 A
(58) Field of Search .................... 416/204 R, 223 R, 416/231 A, DIG. 3

(56) References Cited

U.S. PATENT DOCUMENTS

| | | | |
|---|---|---|---|
| 3,306,588 A | * | 2/1967 | Reid ........................ 416/204 R |
| 3,806,126 A | | 4/1974 | Gilbert |
| 4,042,244 A | | 8/1977 | Kakovitch |
| D253,776 S | | 12/1979 | Molenaar |
| 4,240,858 A | | 12/1980 | Lamlee |
| 4,270,907 A | | 6/1981 | Rodriquez-Perazza |
| 4,384,717 A | | 5/1983 | Morris |
| 4,640,029 A | | 2/1987 | Hornblad et al. |
| 4,766,514 A | | 8/1988 | Johnson |
| 4,850,798 A | | 7/1989 | Bailey |
| 4,936,571 A | | 6/1990 | Buhr |
| 5,092,809 A | | 3/1992 | Kessler |
| D331,785 S | | 12/1992 | Mast |
| 5,324,037 A | | 6/1994 | Greeson |
| 5,411,330 A | * | 5/1995 | Arutyunov et al. ..... 416/231 A |
| 5,624,388 A | | 4/1997 | Lehr |

\* cited by examiner

*Primary Examiner*—John Kwon
(74) *Attorney, Agent, or Firm*—Daniel L. Dawes; Myers, Dawes & Andras LLP (57) ABSTRACT

The Mamikon spinner is a continuous 3 twist, single surface, having threefold symmetry and dynamic properties. It spins with a slight flow of air in the direction of the axes, and when rotated about the axis of symmetry, it acts as a blade, propeller or fan, providing for a multiplicity of utilitarian, educational, entertainment and ornamental uses.

12 Claims, 5 Drawing Sheets

SPINNER WITH CONTINUOUS 3-FOLD SYMMETRY FOR MULTIPLE UTILITARIAN, EDUCATIONAL AND ORNAMENTAL USES

BACKGROUND OF THE INVENTION

1. Field of the Invention

The invention relates to the field of spatial, continuous surfaces having spinning and other dynamic properties which may be used in a multiplicity of educational, utilitarian and ornamental applications.

2. Description of the Prior Art

The use of a Mobius strip for multiple uses is well known. Lamlee, "Method of Making a Hexaflexagon," U.S. Pat. No. 4,240,858 (1980) describes in FIG. 1 a sheet 10 of stock material which may be card stock, cardboard, plastic, PVC, PVA, acetate or any of thin, opaque or transparent material which is relatively rigid. FIG. 5 shows coated strips comprised of a sandwich 35 that has been cut into strips 42. These strips are comprised of triangular sections 44 of sheet stock covered on both sides by a transparent material. FIG. 7 illustrates a chain 55 comprised of 19 triangles. Beginning with hinge 56 and continuing along hinges 58, 60, 62, 64, 68, 70 and 72, the strip is twisted in one direction and folded onto itself to produce strip 73 shown in FIG. 8. Strip 73 is then folded along hinge 74 to produce the strip configuration 76 shown in FIG. 9. Triangle 84 is folded into position between triangle 83 and 81 and triangles 81 and 84 are glued together. The resulting structure is depicted in FIG. 10. Six of the triangular sections 86 comprising the strip of FIGS. 5 and 7 are then arranged in a side-by-side form of hexagon.

At column 3, beginning at line 50, Lamlee states that the strip portion comprising triangles 79, 80 and 81 are folded under triangle 82 along hinge 78. Triangle 84 is then folded to a position between triangles 83 and 81 and triangles 81 and 84 are adhered together. The resulting structure is shown in FIG. 10. The Lamlee device is actually nothing more than a flattened Mobius strip.

Lehr, "Therapeutic Elbow Support Method," U.S. Pat. No. 5,624,388 (1997) shows in connection with FIG. 2, a device 1 comprised of a loop of elastic material. Loop has a 360° twist built into it in order to provide a distinct first surface 2 and a second surface 3. The device of FIG. 2 is similar to a Mobius strip, however, the strip is twisted 360° as opposed to 180° as in the Mobius strip. As shown on FIG. 2, device 1 will form a figure eight shape which divides the loop into an upper band 5 and lower band 6. The upper and lower band intersect at a cross over point 7.

Bailey, "Modified Helicoidal Wind Responsive Device" U.S. Pat. No. 4,850,798 (1989) describes the three dimensional surface formed like two line segments positioned at right angles with respect to another which rotate one about the other on an axis while simultaneously moving along the axis line. The generation of the conventional regular helicoid is shown in FIG. 5. FIG. 4 illustrates a wind-responsive device 10 having a modified helicoidal structure. The device, which is intended primarily to be used as a decoration, is suspended at its upper end from a swivel 20 connected to an eyelet 22 permitting free rotation structure. The embodiment shown in FIG. 1 comprises devices 10A and 10B arranged along a common axis and commonly connected at their upper end. FIG. 6 shows an attachment of sections 10A and 10B with their reinforced section oppositely extending. The greatest visual effect of the two sections are when they have different contrasting colors.

Rodriguez-Perazza "Link Chain for Power Drives," U.S. Pat. No. 4,270,907 (1981) shows in FIG. 3 an endless an standard link chain 300 which includes 25 links 301–325 which are coupled together with a quarter turn twist given to the chain before forming it into a closed loop. The chain drive therefore is an endless chain with a quasi-Möbius twist. By doing so, each link 301–325 engages as an adjacent link with an average of 86.4° which turns out to have an advantage for gear engagement. If my visualization of the geometry is correct, this is a conventional Möbius twist or Möbius twist with two series twists.

Molenaar, "Pinwheel," U.S. Des. Pat. No. 253,776 (1979) shows that FIGS. 1–7 a conventional pinwheel designed to be ornamental and rotated the wind.

Hornblad, et al. "Möbius Strip and Display Utilizing the Same," U.S. Pat. No. 4,640,029 (1987) which shows in FIG. 1 a loop which in first appearance is in fact a conventional Möbius strip. Both clockwise and counter clockwise Möbius strips exist depending on whether the end of an ordinary loop is turned clockwise or counter clockwise in joining it together with opposing end to form the Möbius strip. The strip shown in FIG. 1 happens to be clockwise Möbius strip, which may give you some momentary confusion if you have to compare it against the model of a counter clockwise Möbius strip.

Greeson, "Möbius Strip Puzzle," U.S. Pat. No. 5,324,037 (1994) is actually a counter clockwise Möbius strip.

What is needed is a symmetrical three-twist object, with a different geometry from the Mobius strip, which is dynamic in its function and is a spinner.

SUMMARY OF THE INVENTION

The invention, the Mamikon Spinner, is an object which is comprised of an elongated strip (whose proportions preferably exceed 6:1) of a thin, rigid or flexible material, whose one end is twisted three times and attached (e.g. sealed, glued, welded) to the other end, to form a symmetric "threefold", three-dimensional shape. Mamikon's spinner is a unique, symmetric, triple twist strip, made by twisting a strip three times while simultaneously turning it in the same direction. The Mamikon spinner has threefold symmetry, a single surface and a single edge. It is three-dimensional and has a defined center axis about which the threefold symmetry is defined.

Geometrically, Mamikon's spinner is an "infinite" one-sided surface with an outside envelope or edge that is hexagonal in outline and triangular within an inside envelope or edge. It can be made in a left-sided or right-sided, mirror image.

The most important feature of this shape, for various applications, is its ability to spin under the slightest flow of fluid through it (e.g. air, water and other liquid or viscous media). The spinner, if left to fall, will spin in a certain direction keeping its plane of symmetry horizontal. The Mamikon spinner, moreover, has lifting or thrusting properties when rotated and, inversely works as a propeller.

To differentiate the Mamikon spinner from the traditional Mobius strip, notice that the Mobius strip is asymmetrical, cannot be made symmetrical, and thus can not spin. It will tumble or wobble when dropped from a height.

The manufacture of the Mamikon spinner does not follow from the Mobius strip. This is because one may twist a strip three times, then bring the ends together, and glue them; and this will result in an asymmetrical, curly object. While the curly object can be made symmetrical by turning it "inside out," it is not readily apparent how this is to be done.

In other embodiments the Mamikon spinner is a two-twist, four-twist or more, symmetrical object. The spinner, when made with an odd number of twists, is a one-sided and one-edged surface, but the spinner with even number of twists is a two-sided and two-edged surface. This topologically confirms that the spinner cannot be considered topologically equivalent to a Mobius strip, which is one-sided only.

The spinner rotates easily around its axis of symmetry in response to the movement of slight air currents in the direction of its axis of symmetry when hung by its center, but is virtually unaffected by stronger airflows perpendicular to the axis of symmetry.

Its uses include educational activities, toys, garden hangers, ornamental mobiles, or attractive objects, lampshades, fans, pumps, propellers and windmills. It may also be used in artistic and design settings such as jewelry, art and architectural objects. Still further, it can be employed in tools such as grinders, drill heads, chain saws and the like.

Thus, in summary the features of the invention can be listed as including the following:

1. An object having an axis of symmetry for use in a fluid comprising a continuous strip loop having three twists in the same directions, the object rotating about the axis of symmetry in the fluid to either move the fluid, or to be moved by the fluid.
2. The object of paragraph 1 wherein the fluid is a gas.
3. The object of paragraph 1 wherein the fluid is a liquid.
4. The object of paragraph 1 wherein the fluid is a flowable solid.
5. The object of paragraph 1 when such object has twofold or more symmetry.
6. The object of paragraph 1 where the object has fourfold, or more symmetry.
7. The object of paragraph 1 for use as a propeller in combination with a driven shaft having an axis of rotation, wherein the object has its axis of symmetry coupled to the shaft about the axis of rotation and is driven by the shaft to create thrust.
8. The object of paragraph 7 wherein the use as a propeller in combination with the shaft is as a helicopter blade assembly to create lift.
9. The object of paragraph 1 for use as a driven blade assembly in combination with a shaft having an axis of rotation, wherein the object has its axis of symmetry coupled to the shaft about the axis of rotation and drives the shaft when the object is rotated by moving fluid.
10. The object of paragraph 11 wherein the blade assembly is used as a windmill blade assembly.
11. The object of paragraph 1 for use as a driven tool in combination with a rotating shaft having an axis of rotation, wherein the object has its axis of symmetry coupled to the shaft about the axis of rotation and is driven by the shaft, the strip loop having an edge and at least the edge being provided with a cutting surface.
12. The object of paragraph 1 for use as a driven tool in combination with a rotating shaft having an axis of rotation, wherein the object has its axis of symmetry coupled to the shaft about the axis of rotation and is driven by the shaft, the strip loop having an edge and surface, and being composed of rigid material so that the edge and surface provide a processing edge and surface for materials brought into contact therewith.
13. The object of paragraph 12 for use as a driven tool in combination with a rotating shaft where the processing edge and surface provides a grinding action.
14. The object of paragraph 12 for use as a driven tool in combination with a rotating shaft where the processing edge and surface provides a smashing action.
15. The object of paragraph 1 wherein a portion of the object is reflective to provide a sparkling reflecting surface.
16. The object of paragraph 15 wherein the object is combined with a support which allows the object to rotate while being fixed in a position, and wherein the object is used as a garden hanger.
17. The object of paragraph 15 wherein the object is combined with a support which allows the object to rotate while being fixed in a position, and wherein the object is used as jewelry.
18. The object of paragraph 15 wherein the object is combined with a support which allows the object to rotate while being fixed in a position, and wherein the object is used as a visual attractor.
19. The object of paragraph 1 wherein the strip loop has an edge, and an interior portion to the edge, and further comprising a center support coupled to the interior portion of the edge.
20. The object of paragraph 1 wherein the center support coupled to the interior portion of the edge comprises a triangular, cubic, pyramidal or conic fixture attached to the interior portion.
21. The object of paragraph 19 wherein the strip loop has a reflective surface and further comprising a light source mounted in the center support, the center support being arranged and configured to direct at least a portion of light from the light source toward the reflective surface to create a sparkling reflected beam of light.
22. The object of paragraph 21 wherein the beam of light has at least two color components and wherein the reflective surface of the strip loop is provided with a diffracting surface to decompose the beam of light into the color components.
23. The object of paragraph 1 further comprising a release mechanism so that when the object is rotated through the release mechanism, the object may be disconnected therefrom to permit flight.
24. The object of paragraph 1 wherein the strip loop is made of piecewise flat components with low radar cross sections and comprised of low radio-reflective material.
25. The object of paragraph 19 further comprising a triangular center support whereby a spinning architectural design is provided.
26. The object of paragraph 19 further comprising a sound making device coupled to the object, rotation of the object activating the sound making device.
27. The object of paragraph 1 wherein the object is configured to be used as a manipulative for educational geometric activity package.
28. The object of paragraph 1 wherein the object is twisted 2, 4 or more times such that the object is symmetrical and is capable of spinning when fluid flows through it.
29. The object of paragraph 1 wherein the strip is shaped to increase aerodynamic efficiency when the object is spun.

The invention may be better visualized by turning to the following drawings wherein like elements are referenced by like numerals.

The invention now having been illustrated in the foregoing drawings its detailed description and alternative embodiments may be better understood by turning to the following detailed description of the preferred embodiments.

DETAILED DESCRIPTION OF THE PREFERRED EMBODIMENTS

Consider first the abstract geometric form and topological characteristics of the invention which hereinafter shall be referenced as a Mamikon spinner. The Mamikon spinner is made from an elongated rectangular strip of a thin, rigid or flexible material whose proportions preferably exceed 6:1 length to width. The strip is twisted or flipped three times and closed at its ends by sealing, gluing, welding or any other means of attachment. See FIGS. 1a, b, c, and d. The strip may also be integrally molded in a multipart mold. Geometrically, the spinner formed from the strip is an infinite one-sided surface with one edge and a hexagonal outline from the exterior or outside and a triangular outline from the interior or inside. See FIG. 15. The spinner may be fabricated to be either as a left-handed or right-handed version, which versions are mirror images of each other. The shape and the properties can be changed by varying the length of the strip and the width of the strip independently from each other and from the thickness and resiliency of the strip material. The length and width of the strip will determine the angle of attack of the leading edge of the strip when used as a spinner or propeller.

Figure 1A:
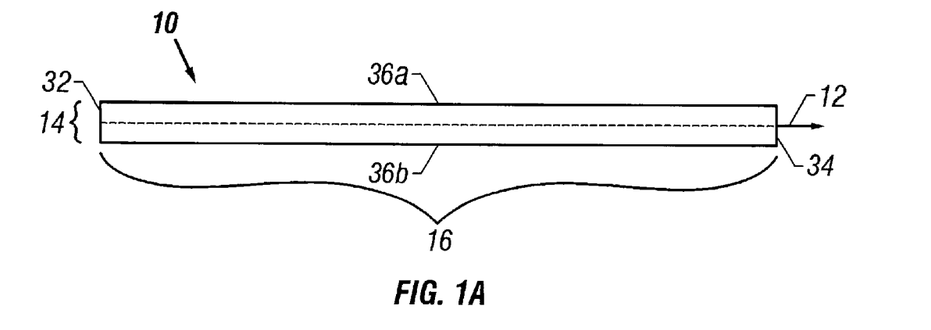
FIG. 1a is a plan view of a flat strip of material before any manipulation.

A model of the Mamikon spinner may be fabricated by beginning with a flat strip of sheet material generally denoted by reference numeral 10 in FIG. 1a. The reference numeral 10 will be used interchangeably for the invention either when discussed in terms of the flat strip from which it can be made, or in its assembled or completed three dimensional form as a spinner. See FIGS. 2 and 14. In this sense the terms, "strip" and "spinner" will be used to refer to different forms of the same object according to context.

Mamikon spinner 10 in the illustrated embodiment is thus a linear, flexible flat strip having a longitudinal axis 12, a width 14 and length 16. Strip 10 has opposing ends 32 and 34 and opposing longitudinal edges 36a and b. Width 14 and length 16 are arbitrary and may assume any value desired, as may be selection of material composition of spinner, which is consistent with the broadest scope and interpretation of the teachings of the present invention.

Figure 1B:
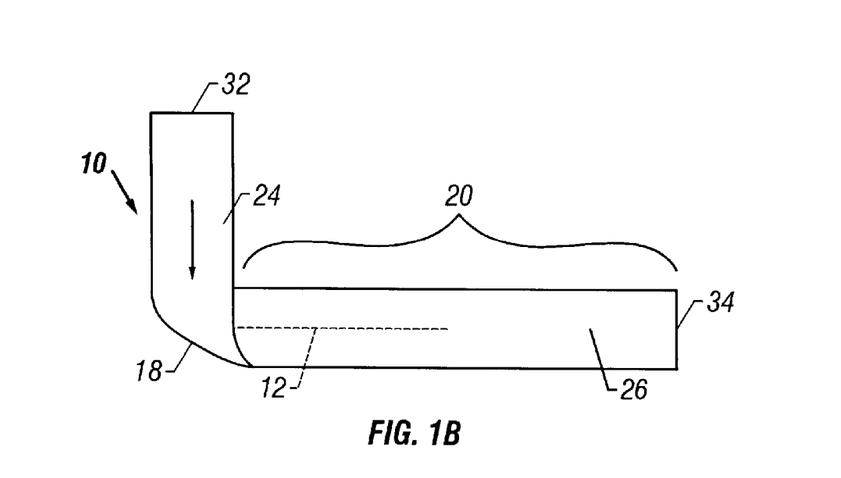
FIG. 1b is a perspective view of the strip of FIG. 1a after the first twist and turn.
Figure 1C:
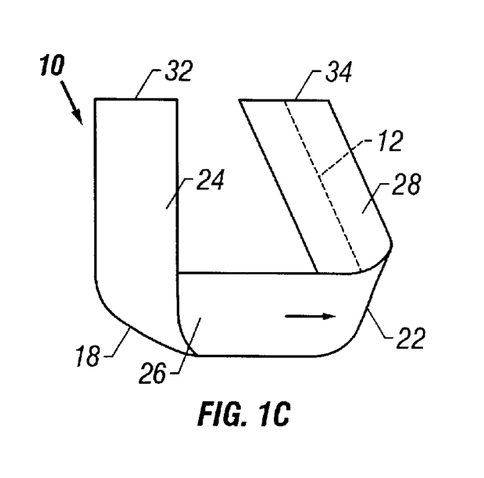
FIG. 1c is a perspective view of the strip of FIGS. 1a and b after the second twist and turns in the same direction.
Figure 1D:
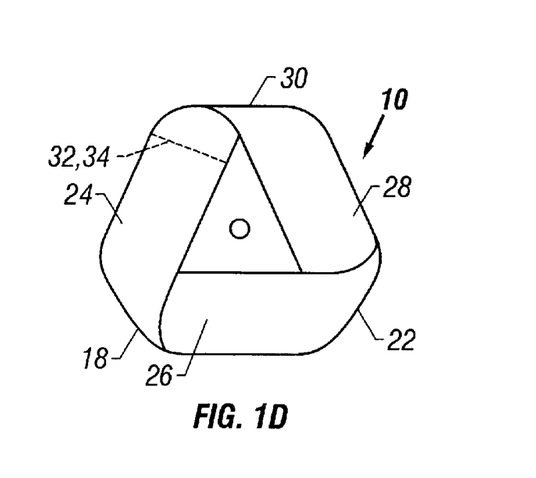
FIG. 1d is a perspective view of the strip of FIGS. 1a, b and c after the third twist and turn in the same direction; and after the ends have been joined together.

A model of the Mamikon spinner may be formed by making a first clockwise twist as seen when looking down strip 10 along the arrow shown in FIG. 1b. A second clockwise twist 22 is then made in the remaining portion 20 of strip 10 of FIG. 1b as shown in FIG. 1c thereby forming legs 24, 26 and 28 of spinner 10. Mamikon spinner 10 is then completed by making a third clockwise twist 30 in leg 28, and is completed by joining the two free adjacent ends 32 and 34 together as shown in FIG. 1d.

Figure 12:
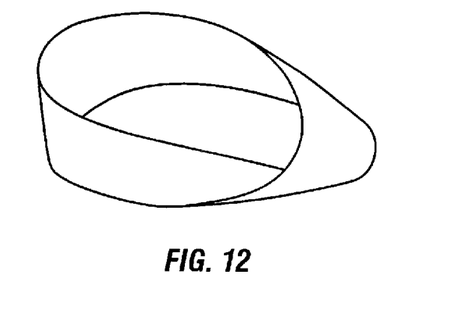
FIG. 12 is a perspective view of a conventional Mobius strip.
Figure 13:
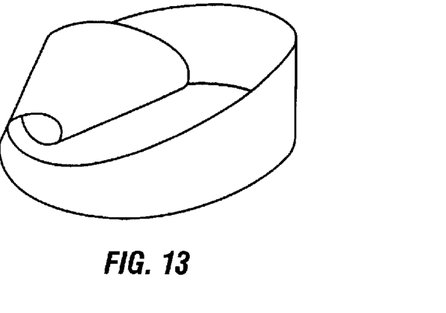
FIG. 13 is a perspective view of a strip which has been folded three times, but has not been formed into a Mamikon spinner.
Figure 15A:
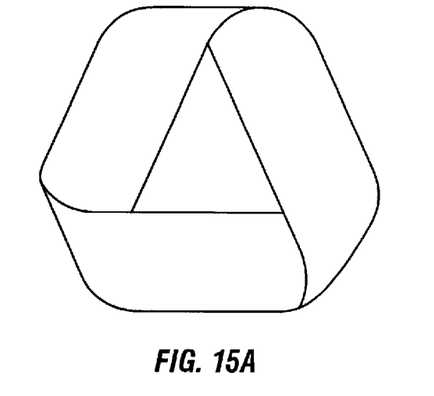
FIG. 15 is a top plan view of a left and right sided Mamikon spinner.
Figure 15B:
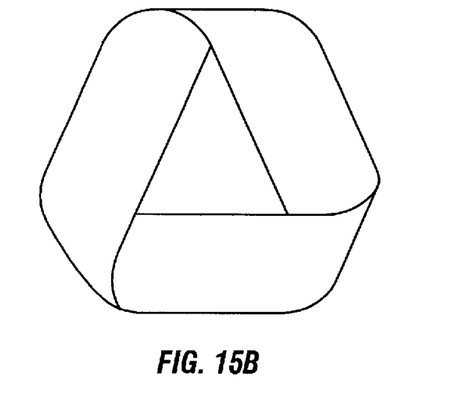
Figure 16A:
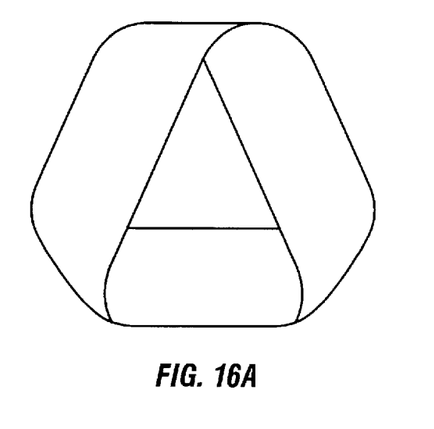
FIG. 16 is a top plan view of "quasi-symmetrized" left and right sided Mobius strips.
Figure 16B:
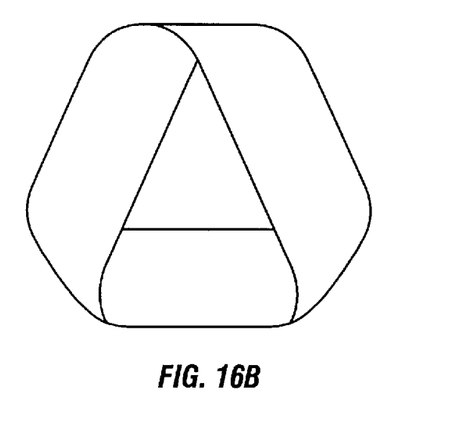

Geometrically, Mamikon's spinner is an "infinite" one-sided surface with one edge and has hexagonal exterior outline and triangular interior outline. It can be made left-sided or right-sided, which are mirror images of each other as shown in FIG. 15. The most important feature of this shape, for various applications, is its spinning ability under a slightest flow of air (water and other liquid or viscous media). The spinner, if it is let to fall, will spin in a certain direction keeping its plane of symmetry horizontal, which demonstrates the symmetry of its shape and of the dynamic forces applied to it by a uniform flow of fluid through it. The Mobius strip does not have this property, and falling down it will tumble or topple but not spin. Even if we try to "symmetrize" the Mobius strip by distorting its shape to make it look as if it has three-fold symmetry as in FIG. 16, it will have an unstable shape tending to return to initial asymmetric shape as shown in FIG. 12. The spinner's appearance is similar in plan view to the "recycling sign" which was never meant to be a continuous three-dimensional shape, but rather a two-dimensional picture or three separated turning arrows with no physical significance or application.

Mamikon's spinner has dual features: it can transform a wind flow into rotation or, reversibly, transform rotation into a wind flow. It can be used, mostly and more effectively, in any application where ordinary propellers or fans are used.

The spinner is a different type of propeller with wings or blades. It is one continuous wing/blade, in this case replacing three ordinary separated blades. Its shape and the properties can be changed by varying the length of the strip and the width of the strip, which should not be confused with the thickness of the material comprising the strip. This will allow the size of the spinner to be bigger and the internal triangular opening wider or narrower for various purposes.

The shape can be changed without changing the two sizes mentioned above, by making the shape of the spinner flatter or fatter in side profile, i.e. thinner, or thicker if looking from its side view. This can be done by changing the slopes of the inner edges of the spinner which are closest to the rotational axis of symmetry. All the above changes affect the angle of attack of the spinner, which is in general, for any piece of the surface, defined ordinarily as the angle between the plane of the wing or blade surface and the plane in which the wing or blade surface moves (transports), or the direction of motion. Another way to describe the angle of attack is to cut the wing surface or blade surface with a vertical plane in which the horizontal velocity of that portion of the wing lies. In this vertical plane we will have two lines: the velocity vector and the cross-sectional line of the wing or blade surface. The angle between the velocity vector and the line of the wing or blade surface is the angle of attack. The attack angle may vary at different locations on the spinner. The integral angle of attack is an important parameter for various applications. It determines the efficiency of transforming the wind flow into rotation or, reversibly, rotation into a wind flow.

The geometric or topological shape as a special mathematical surface, however, does not suggest its useful physical and mechanical features and dynamic behaviors like of its spinning properties, which comprise the invention in this application.

Figure 2:
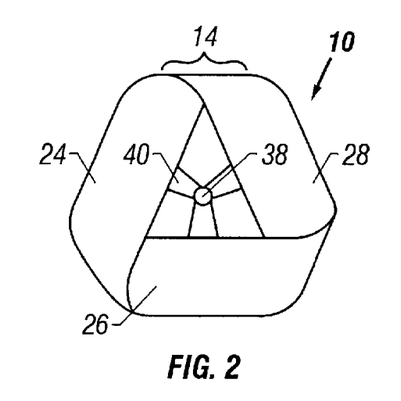
FIG. 2 is a top plan view of the spinner of the invention in which the strip width is increased and a center pivot attached to the inside parts of the spinner's edge.

It now may be readily understood that a multiple of educational, utilitarian and ornamental applications may be made with the Mamikon spinner. For example, in the embodiment shown in plan view in FIG. 2, if width 14 is chosen large enough with respect to length 16, when constructed, the Mamikon spinner may form a closed or nearly closed triangular three dimensional configuration when seen in plan aspect as shown in the view of FIG. 2 thereby forming a self-supporting propeller shape or a propeller airflow shape which can be supported about a center axis 38 on the axis of symmetry through three symmetrically disposed struts 40 connecting axis 38 to the center of the interior portion of edge 36a, b of each of the legs 24, 26 and 28. The Mamikon spinner may then be driven by air having a velocity component parallel to axis of rotation 38. Alternatively, the Mamikon spinner may be employed as a propeller and driven by axis 38 to create a movement in air or fluid in the same direction.

This feature adapts Mamikon spinner 10 to a multiplicity of activities and uses as an instructional or educational object, as a spinning of flying toy, similar to a Frisbee, as a garden hanger to chase away birds from protected vegetation, as a ornamental attractive device like a pinwheel, flag, Christmas tree ornament, hanging and spinning automobile deodorizer, or moving or mobile architectural ornament. When the Mamikon spinner is made of a reflective material or has a reflective layer on various parts, its appearance is further aggrandized by faceted reflection of light from its reflective surfaces as they change angular orientation with respect to the eye of the viewer. The interaction of the moving reflector with light not only enhances the foregoing applications, but also lends it to an interesting use as a lampshade or garland.

The inherent symmetry, smooth curves and surface of Mamikon spinner is inherently attractive or aesthetic to the human eye adapting its use as jewelry with the added addition that it may be mounted so that it spins or rotates when worn as an earring, brooch, tie-clip or other personal adornment.

Because of its ability to act as a fan, pump impeller, propeller, or blade, Mamikon spinner can then be utilized in various types of mechanisms for moving or being moved by liquids or fluids. An impeller for use in moving heavy or viscous liquids is particularly envisioned or its use in aeronautical or marine application and helicopter or boats is also contemplated. Its use for generating electricity or mechanical motion through windmill or water mill is included.

As a rotatable object, Mamikon spinner could be made of rigid material and provided with a knife edge on the exterior portion of its edge or on the entire edge and be used as a food processor blade or cutting tool. Also, because it has a single edge, a cutting chain can be mounted on the edge in the fashion of a chain saw and used as a wood or rock cutting tool. No limitation on the applications of the Mamikon spinner is contemplated in its combination with other elements to adapt it to a multiplicity of useful, educational, entertaining or ornamental applications as expressly contemplated.

More specifically, the Mamikon spinner can be applied to the following types of applications.

Figure 3:
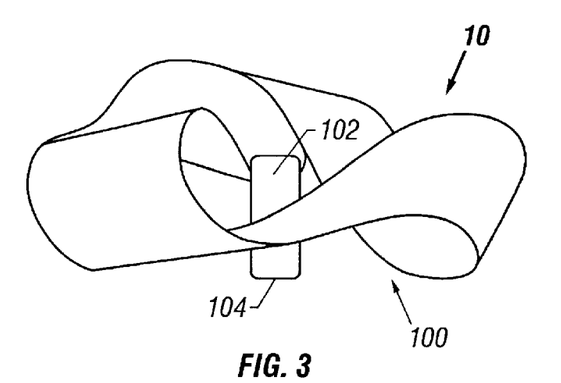
FIG. 3 is a simplified perspective view of the spinner used as a helicopter blade assembly.

First, the spinner can be adapted to perform as a helicopter propeller as shown in FIG. 3. A Mamikon spinner fabricated as an airfoil or propeller is coupled to a hub 102 of a helicopter 100. Hub 102 is driven in turn by a shaft 104 powered by the helicopter's engine (not shown). Hub 102 is connected to the interior portions of the edge of Mamikon spinner 10 at at least three points. By moving the radial position of attachment of hub 102 to spinner 10, spinner 10 can be flexed and the angle of attack changed. Selective movement of the three attachment points allows for collective and cyclic pitch control using a hub control similar to a conventional helicopter hub system.

Figure 14:
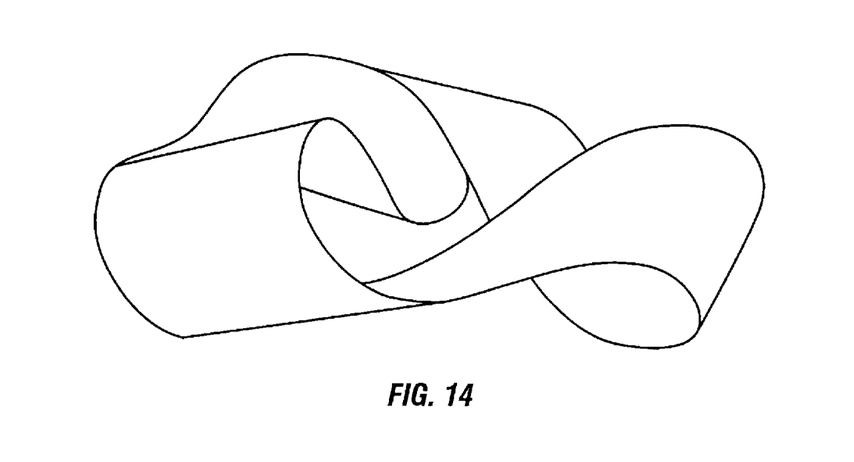
FIG. 14 is a side perspective view of a strip which has been folded three times, into a Mamikon spinner.

In another version the opening-closing of spinner 10 may be flexed by opening and closing it at intervals such that it effects control of the angle of attack. In this version the opening and closing of the hub 102 might be operated by mechanical means, or electronically with a memory-metal type device that would pull in the sides of hub 102. In this version hub 102 could be opened and closed at alternating fast or slow intervals to control lifting force, angle of attack, or other aspects of aerodynamics. Mamikon spinner 10 is expected to be much more efficient than traditional propellers or blade assemblies for many reasons, namely it is more compact, stronger in its integrity, has much bigger working surface area, and this "effective" area is spread along the outside edge of spinner 10 which moves at a greater linear velocity. Also Mamikon spinner 10 as a rotating spinner creates three organized or streamlined jet flows of fluid through its three fold-looped surfaces as seen in FIG. 14 which reduce the turbulence and thus increase the efficacy. Unlike the traditional propellers Mamikon spinner 10 rotated as a spinner will be stronger, unbreakable, and will not stick out from the helicopter too far, thus saving space and creating less danger of hitting close-by objects.

For changing the shape slope of the surface of spinner 10 and thus the attack angle of the surface, on the pivot or hub 102 of spinner 10 (which hub 102 can be made slightly conical) three symmetrically located holes can be made in each of which a rotating device is installed which is attached to the inner edge of spinner 10. Control of these rotating devices is provided from inside of hub 102, for example by a long screw-type axle inside hub 102. The control of the angle of attack can be controlled remotely with conventional laser, infrared or radio control devices.

Similarly Mamikon spinner 10 rotated as a spinner can be used as a propeller for planes, boats, fans, instruments and any application were a driving or driven propeller is used. Positioned vertically the spinner can serve as a propeller for common meteorological instruments measuring the wind characteristics. Use in a hovercraft as the main lift element is also contemplated.

Figure 4:
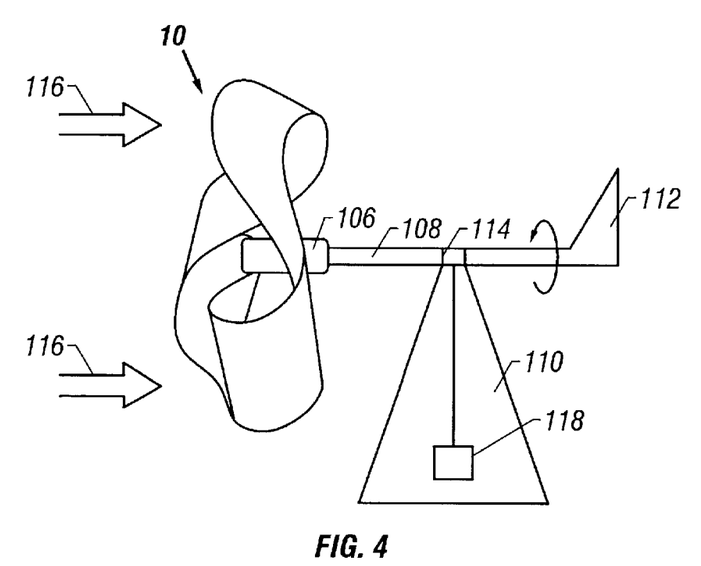
FIG. 4 is a simplified perspective view of the spinner used as a windmill blade assembly.

Second, the Mamikon spinner rotated as a spinner can be used in windmills or windpower generators for generating electricity or other useful work as shown in FIG. 4. Here Mamikon spinner 10 is coupled to a fixed hub 106 at its interior portions of the edge of strip 10. Hub 106 is coupled to and turns shaft 108 as the wind, denoted by arrows 116, turns spinner 10. Rotation of shaft 108 is used in a conventional manner to useful work, such as being coupled through a transmission 114 to a generator 118 in a windmill tower 110. The downwind end of shaft 108 is coupled to a conventional wind vane 112 which keeps the spinner turned directly into wind 116. The parameters of spinner 10 can be changed so that it will be more efficient in using wind to rotate the spinner rather than using rotation to create flow as in helicopter propeller. For example, instead of a fixed hub 106, hub 106 may include controls similar to those described in connection with the helicopter to allow for manual or automatic adjustment of the aerodynamic parameters of spinner 10 depending on wind conditions. The two types of applications above work inversely to each other, namely one transforms rotation into wind and the other transforms wind into rotation, therefore they must be designed in the most effective way in each case by choosing the appropriate design parameters. A spinning lampshade rotated by heat convection is, for example, an application of the second type. As a drag element, the invention can be used in hang gliders, parachutes, sea anchors, or ultralight aircraft.

Figure 5:
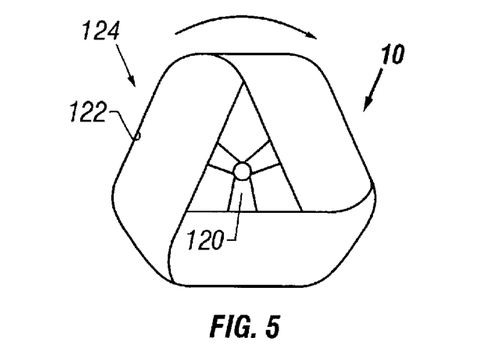
FIG. 5 is a simplified perspective view of the spinner used as a drill head or cutter.

Third, the Mamikon spinner rotated as a spinner can be used in drill heads and cutters If made of strong material with a sharp or a toothed edge as shown in FIG. 5. The spinner can serve as a device for cutting holes. Even a cutting chain can be put around the entire edge of spinner 10 for certain efficiency. In FIG. 5 Mamikon spinner is coupled to a rigid, fixed spider hub 120 on at least three interior positions of the edge of spinner 10. The entire or at least a portion of the edge 122 of spinner 10 is provided with teeth or a cutting surface 124, which includes the embodiment of a moving cutting chain carried and supported by edge 122.

Figure 6:
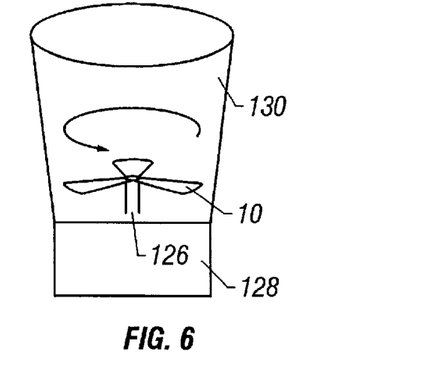
FIG. 6 is a simplified perspective view of the spinner used as a processing mill or smashing.

Fourth, the Mamikon spinner rotated as a spinner can be used in grinders and food or material processors as shown in FIG. 6. Spinner 10 can be used for grinding foods, such as in coffee grinders, or for chopping, such as in a vegetable chopper. If rotating in the other direction it can effectively smash foods or materials such as tomatoes, creams, etc. The organized flows of material through the three loops of spinner 10 are useful for material processing. In FIG. 6 Mamikon spinner is again coupled to a driven shaft 126 which in turn is connected to a motor (not shown) in housing 128. Spinner 10 is disposed in the bottom of a container 130 into which food or material to be processed is placed, similar to a conventional blender.

Figure 7:
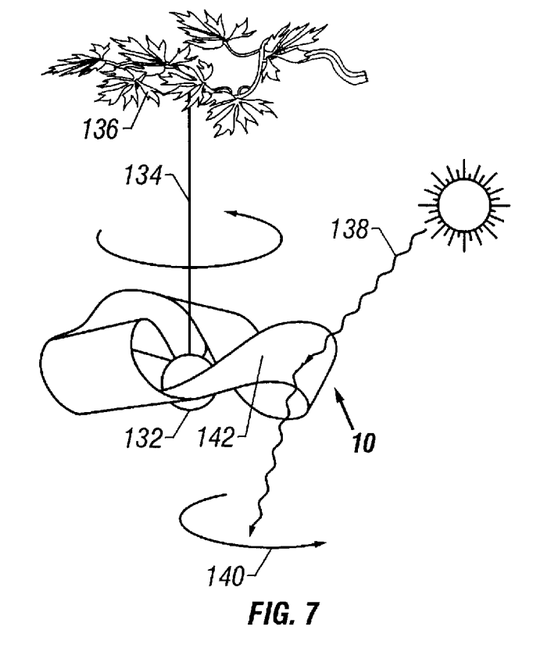
FIG. 7 is a simplified perspective view of the spinner used as a spinning garden hanger or visual attractor.

Fifth, the Mamikon spinner rotated as a spinner can be used in garden hangers and attractors as shown in FIG. 7. Mamikon spinner 10 is connected again at its interior portion of edge 122 to a shape 132, such as a cube. A string 134 is coupled to shape 132 at one end and is attached to a limb 136 or a tree or plant by conventional means at the opposing end. Hung by a string from its center from a tree or even indoors on a string, spinner 10 will constantly spin by the air convection or any vertical component of the wind. The sunshine, denoted by wavy line 138, surrounding lights, light from a candle or other light source located in the central part of the spinner creates very attractive moving reflection 140 from the surface of the spinner, which can be also made or covered with spectral diffraction material 142 to create a rainbow of moving colors. Also, because spinner 10 reflects sparkling sunshine which is visible at very far distances and in all directions as it rotates, it can be used as a visible attractor to attract customers at a distance to retail establishments like cafeterias, galleries, shopping centers etc. Experiments show that the moving, sparkling reflection of the spinner also chases away unwelcome birds and animals from garden.

Figure 8:
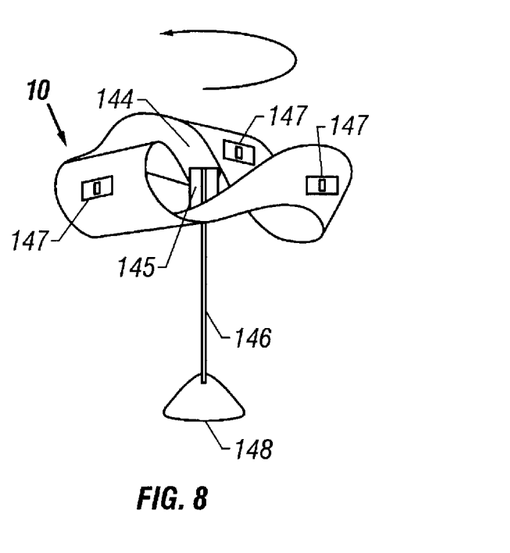
FIG. 8 is a simplified perspective view of the spinner used as a spinning toy.

Sixth, Mamikon spinner 10 rotated as a spinner can be used as a toy with a cube or pyramid attached to the inside edges in the triangular center of spinner 10 with a string or rigid stand attached to the cube or pyramid as shown in FIG. 8. In FIG. 8 Mamikon spinner is shown attached to a shape 144 in its center, which shape is pivoted by conventional means on a rigid vertical arm 146 held by stand 148. It spins, shines, and can even be used to create sounds by affixation of conventional air flow actuated sound making devices or whistles 147. Sound can be achieved either by virtue of the air moving over the surface of spinner 10 or whistles 147 added to the surface, or the rotary motion of the spinner can be used as the motive power for a conventional sound making device powered by the spinner. A coil spring (not shown) can be added in series to the string to add certain dynamic features, namely a vertical oscillation in addition to the rotation of spinner 10 in the horizontal plane. A conventional release mechanism 145 can also be designed to let the spinner fly after reaching a predetermined high spinning momentum.

Figure 9:
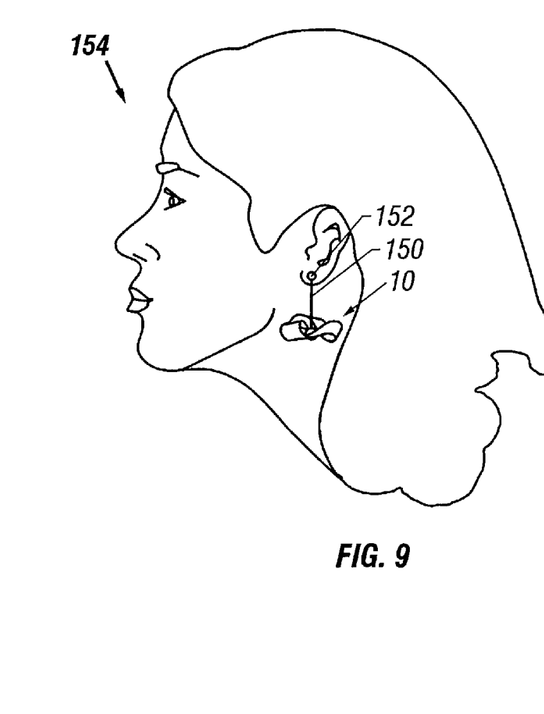
FIG. 9 is a simplified perspective view of the spinner used as jewelry.

Seventh, the Mamikon spinner rotated as a spinner can be used in jewelry, such as in earrings and brooches as shown in FIG. 9. A wearer 154 is shown in FIG. 9 with an earring comprised of a horizontally suspended Mamikon spinner 10, which is freely rotatable on a pendant 150 connected at its opposing end to the wearer's ear lobe by a conventional earring connector. The spinner can be made left- and right-sided for the two ears. They can hang horizontally or hang vertically or sideways, and still spin. There can be diamonds and other stones inside spinner 10 in various geometric forms to catch and throw the light from their facets.

Figure 10A:
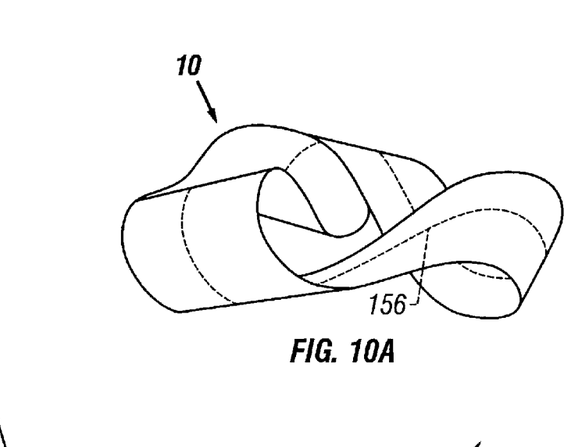
FIG. 10 is a simplified perspective view of the spinner used as a geometric educational model.
Figure 10B:
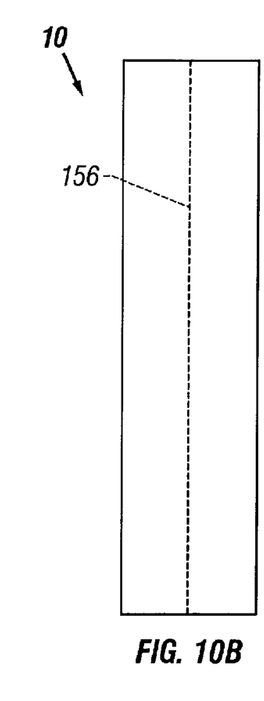

Eighth, Mamikon spinner 10 can be used in educational packages with instructions on how to make the spinner and to do various tricks, puzzles and games based on spinner's geometric properties. The paper strips perforated along midline 156 are included in package from which to make the spinner as shown in FIG. 10. A simple machine (not shown) has been designed to produce these paper materials.

Figure 11:
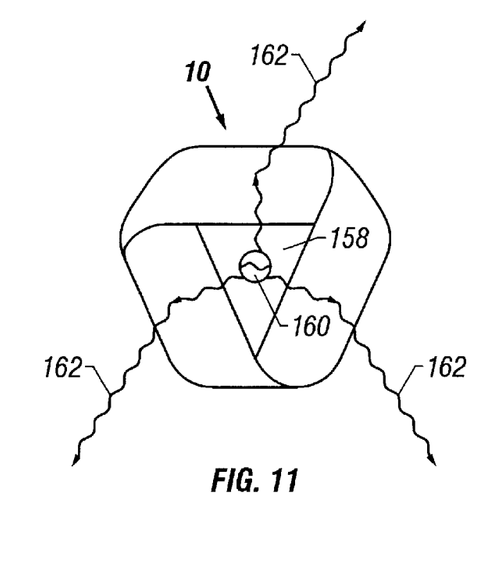
FIG. 11 is a simplified perspective view of the spinner used as a light spinner in which a light source or sound source has been incorporated in a center fixture.

Ninth, Mamikon spinner 10 rotated as a spinner can be used in combination with a variety of mounting devices nested in the center of spinner 10. Such center shapes or devices 158 may take the form of a triangle, a cone, a pyramid with triangular base (tetrahedron), or a cube whose three non-adjacent edges, which engage the three inner edge of spinner 10. The center object can be empty inside and provided with holes, or made from see-through screenlike material. A candle, flashlight or other source of light 160 can be located inside the center shape 158 to create projected reflections 162 from the shiny surface of spinner 10 as diagrammatically depicted in FIG. 11.

Spinner 10 can be used as a warning or emergency sign using a rotating reflective surface. For example, it can be used in ice fields, snow, forests and canyons to mark the position of lost hikers, tourists, bikers, people or animals. The spinner can reflect the sunshine or search lights from helicopters and other search and rescue equipment.

The ordinary Mobius strip has over 200 already patented applications. All of them can be reconsidered for application using Mamikon spinner 10, and most of them will be more efficiently realized due to the symmetry, the dynamic features and the stability of Mamikon spinner's shape.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An object having an axis of symmetry for use in a fluid comprising a continuous strip loop having three twists in the same directions, said object rotating about said axis of symmetry in said fluid to move said fluid.

2. The object of claim 1 wherein said fluid is a gas.

3. The object of claim 1 wherein said fluid is a liquid.

4. The object of claim 1 wherein said fluid is a flowable solid.

5. The object of claim 1 when such object has twofold or more symmetry.

6. The object of claim 1 where said object has fourfold, or more symmetry.

7. The object of claim 1 for use as a propeller in combination with a driven shaft having an axis of rotation, wherein said object has its axis of symmetry coupled to said shaft about said axis of rotation and is driven by said shaft to create thrust.

8. The object of claim 7 wherein said use as a propeller in combination with said shaft is as a helicopter blade assembly to create lift.

9. The object of claim 1 wherein said strip loop has an edge, and an interior portion to said edge, and further comprising a center support coupled to said interior portion of said edge.

10. The object of claim 1 wherein said center support coupled to said interior portion of said edge comprises a triangular, cubic, pyramidal or conic fixture attached to said interior portion.

11. The object of claim 1 wherein said object is twisted 2, 4 or more times such that the object is symmetrical and is capable of spinning when fluid flows through it.

12. The object of claim 1 wherein said strip is shaped to increase aerodynamic efficiency when said object is spun.

* * * * *